US008326874B2

(12) United States Patent
Wright et al.

(10) Patent No.: US 8,326,874 B2
(45) Date of Patent: Dec. 4, 2012

(54) MODEL-BASED IMPLIED AUTHORIZATION

(75) Inventors: Travis A. Wright, Sammamish, WA (US); Varsha Jayasimha, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 499 days.

(21) Appl. No.: 12/485,948

(22) Filed: Jun. 17, 2009

(65) Prior Publication Data

US 2010/0325159 A1    Dec. 23, 2010

(51) Int. Cl.
G06F 17/30    (2006.01)
G06F 9/54     (2006.01)
(52) U.S. Cl. ........ 707/783; 707/805; 719/315; 719/328; 726/21
(58) Field of Classification Search .................... 707/783
See application file for complete search history.

(56) References Cited

U.S. PATENT DOCUMENTS

| 5,335,346 | A  |   | 8/1994  | Fabbio          |       |
|-----------|----|---|---------|-----------------|-------|
| 6,061,684 | A  | * | 5/2000  | Glasser et al.  | 1/1   |
| 6,208,984 | B1 | * | 3/2001  | Rosenthal       | 707/783 |
| 6,851,054 | B2 | * | 2/2005  | Wheeler et al.  | 713/176 |
| 7,120,635 | B2 | * | 10/2006 | Bhide et al.    | 1/1   |
| 2003/0074356 | A1 | * | 4/2003 | Kaler et al.    | 707/9 |
| 2005/0028008 | A1 | * | 2/2005 | Kumar           | 713/200 |
| 2005/0188421 | A1 | * | 8/2005 | Arbajian        | 726/4 |
| 2006/0230281 | A1 |   | 10/2006 | Hofmann         |       |
| 2006/0282433 | A1 |   | 12/2006 | Dutta et al.    |       |
| 2007/0283443 | A1 |   | 12/2007 | McPherson et al. |      |
| 2008/0133530 | A1 |   | 6/2008  | Wang et al.     |       |
| 2009/0077062 | A1 |   | 3/2009  | Spivack et al.  |       |
| 2009/0328157 | A1 | * | 12/2009 | Grabarnik et al. | 726/4 |

FOREIGN PATENT DOCUMENTS

WO    03088015 A2    10/2003

OTHER PUBLICATIONS

"Active Directory Architecture", Retrieved at <<http://www.computerjockey.de/w2k/adswp.htm>>, Mar. 24, 2009, pp. 1-38.
"Supporting Context-aware Access Control in Network Authentication and Authorization Architectures", Mar. 2004, Retrieved at <<http://eprints.qut.edu.au/16707/>>, pp. 151-192.

* cited by examiner

*Primary Examiner* — Binh V Ho
(74) *Attorney, Agent, or Firm* — Boswell IP Law; J. Mason Boswell (57) ABSTRACT

An authorization system determines a user's permission to access an object implicitly based on relationships in a data-driven model. The system provides the ability to mark a relationship type in the model between one object class (accessor) and another object class (accessed) as an implicit authorization relationship type. A user can define the permissions granted to the accessor object on the accessed object. When an accessor object tries to access a related accessed object over an authorization relationship type, the authorization system determines the permissions granted by inspecting the implicit authorization relationship type definition. The authorization system can also traverse containment relationship types to grant objects permissions contained by other objects. The authorization system dynamically determines authorization based on a relationship model that more naturally fits the actions that an administrator of a data-driven system is familiar with, and does not involve complex direct authorization or group membership management.

19 Claims, 4 Drawing Sheets

MODEL-BASED IMPLIED AUTHORIZATION

BACKGROUND

An information technology (IT) service desk functions as a point of contact between end users and an IT organization or service provider. Often, the service desk's goal is to restore service to and to fulfill requests from users as quickly as possible. However, recommended practices suggest that the service desk be given a broader role—beyond that of the traditional Help Desk—a role that spans the processes of incident, problem, change, and asset and configuration management. Organizations looking to adopt this approach using traditional technologies face the realities that these technologies are often not flexible enough to meet their needs, lack integration across the rest of their systems management tools, and do not deliver process optimization to match their efforts in adopting recommended practice approaches. Newer applications and platforms, such as those offered by the Microsoft Operations Framework (MOF), seek to overcome these difficulties.

IT management applications, such as Microsoft System Center solutions, help organizations manage their IT environments, from physical to virtual, across desktops, devices, and datacenters. These applications are designed to provide a single window into IT services to allow proactive planning, deployment, management, and optimization across IT platforms. IT management applications capture and aggregate practical knowledge about infrastructure, policies, processes, and recommended practices so IT professionals can build manageable systems and automate operations to reduce costs, improve application availability, and enhance service delivery.

Because of the differences in various environments in which IT workers use IT management applications, IT management applications are often built as data-driven systems in which an IT manager defines various object types that have significance to the organization, attributes for each object type, relationships between object types and so forth. For example, a service desk may have objects that represent service incidents, engineers in the service department, service contracts, and so forth. These objects may have relationships such as an "assigned to" relationship between a service incident and an engineer working on resolving the incident.

One objective of computer security includes protection of information and property from theft, corruption, or natural disaster, while allowing the information and property to remain accessible and productive to its intended users. There are various strategies and techniques used to design secure systems. One technique enforces the principle of least privilege, where an entity has only the privileges needed for its function. That way even if an attacker gains access to one part of the system, fine-grained security ensures that it remains difficult for the attacker to access the rest of the system. Other techniques include subsystems that default to secure settings, and wherever possible are designed to "fail secure" rather than "fail insecure." Ideally, a secure system can only be made insecure by a deliberate, conscious, knowledgeable, and free decision on the part of legitimate authorities. In addition, designers and operators of secure systems often assume that security breaches are inevitable and keep full audit trails of system activity to determine the mechanism and extent of security breaches after they occur.

The state of the art in security authorization solutions today depends on explicitly granting permissions over some objects to a user. One timesaving model allows assigning permissions over groups of objects to groups of users. In some cases, it is not practical to create a group of objects for each user or group of users because the number of groups would be overwhelming for an administrator to maintain and the calculation of group membership may overwhelm a system. Further the traversal of group memberships when determining authorization is more time consuming for the system than evaluating direct access to an object and is more cognitively difficult for an administrator to determine whether a user has access to a given object. Finally, using group-based authorization schemes results in additional complexity when an administrator applies conflicting authorization policies for a given user for a given object. For example, a user A is granted write access to objects in Group Z (which contains Object 1) and is denied access to objects in Group Y, which also contains Object 1. System designers often develop complex algorithms to evaluate permissions in such cases. Typically, groups can be based on either explicit membership (Group Z contains Object 1) or on dynamic group membership rules which evaluate the properties of objects to determine inclusion (include all objects of Type X where Property A="foo" in Group Z). In systems where property values are rapidly changing, rule calculation to determine group membership may not be able to provide a secure solution in real time due to the latency caused by periodically calculating group membership.

SUMMARY

An authorization system is described herein that determines a user's permission to access an object implicitly based on relationships in a data-driven model. The system provides the ability to mark a relationship type in the model between one object class (accessor) and another object class (accessed) as an authorization relationship type. Then, a user can define the permissions granted to the accessor object on the accessed object. When an accessor object tries to access a related accessed object over an authorization relationship type, the authorization system determines the permissions granted by inspecting the authorization relationship type definition. The authorization system can traverse containment relationship types to grant accessor objects (e.g., a user or user group) permissions to accessed objects contained by the accessed object. The authorization system can also traverse containment relationship types of accessor objects to grant permissions to contained accessor objects. If the authorization system finds an appropriate authorization relationship with the appropriate permission to perform an operation between the accessor and accessed objects, then the system grants permission to perform the operation. Thus, the authorization system dynamically determines authorization based on a relationship model that more naturally fits the actions that an administrator of a data-driven system is familiar with, and does not involve complex explicit authorization or group membership management.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

An authorization system is described herein that determines a user's permission to access an object implicitly based on relationships in a data-driven model. It is possible to declaratively define relationship types that relate users to other objects when using a model-based system. If the user is related to a given object using one of these relationship types, the user is automatically granted appropriate permissions to take action related to that object. For example, if the object represents a support incident, and the user is authorized to access the incident, then the system also grants the user the ability to take action related to the incident, such as resolving the incident as closed, assigning it to another user, and so forth. The system provides the ability to mark a relationship type in a model between one object class (accessor) and another object class (accessed) as an authorization relationship type. Then, a user can define the permissions granted to the accessor object on the accessed object. When an accessor object tries to access a related accessed object over an authorization relationship type the authorization system determines the permissions granted by inspecting the authorization relationship type definition.

The authorization system can traverse containment relationship types to grant accessor objects permissions to accessed objects contained by the accessed object. The authorization system can also traverse containment relationship types of accessor objects to grant permissions to contained accessor objects. If the authorization system finds an appropriate authorization relationship between the accessor and accessed objects, then the system grants permission to perform the operation. Thus, the authorization system dynamically determines authorization based on a relationship model that more naturally fits the actions that an administrator of a data-driven system is familiar with, and does not involve complex manual direct authorization or group membership management.

Figure 1:
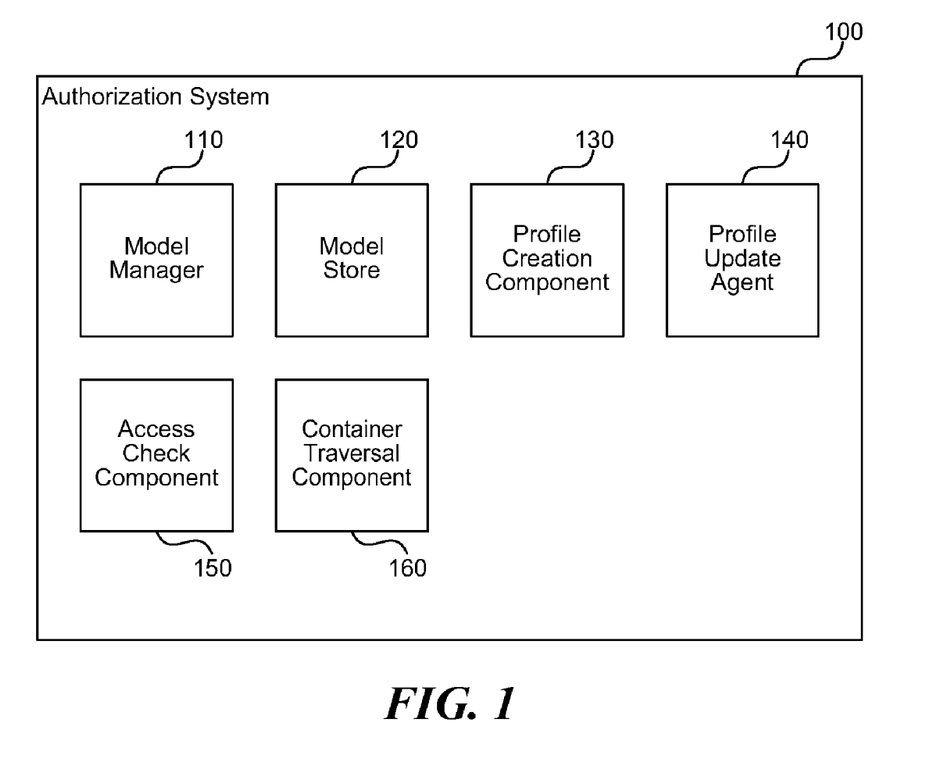
FIG. 1 is a block diagram that illustrates components of the authorization system, in one embodiment.

FIG. 1 is a block diagram that illustrates components of the authorization system, in one embodiment. The system 100 includes a model manager 110, a model store 120, a profile creation component 130, a profile update agent 140, an access check component 150, and a container traversal component 160. Each of these components is described in further detail herein.

The model manager 110 manages an in-memory representation of a data-driven model that operations can query to determine relationships and properties. For example, if the model represents computers in an organization, the model manager may respond to requests to enumerate computers associated with a user or department of the organization, properties of the computer such as the manufacturer, as well as relationships to related objects such as what applications are installed on the computer system. The model manager may provide an application programming interface (API) through which other applications or components make requests to view and manipulate the model. The model manager 110 works closely with the model store 120 to persistently store changes made to objects.

The model store 120 provides persistent storage for the data-driven model. The model store 120 may include a database, file system, storage area network (SAN), computing cloud, XML, CSV or other similar data files, or other storage paradigm that allows for persistently storing objects, relationships, and properties across multiple sessions. The model store 120 may also include transportable formats, such as extensible markup language (XML), that can be used to deploy a particular model to various organizations and to update the model with new features or objects (e.g., update packs). The model store 120 stores the current representation of the model.

The profile creation component 130 provides an interface through which an administrator or other authorized user can create implicit permission profiles that define permissions to access objects in the data-driven model based on relationships among objects. For example, an implicit permission profile may grant a user to modify an object for which the user is the owner of the object as defined by an "owner" relationship specified in the model. The interface may include a user interface displayed on-screen to the user or other types of interfaces, such as a scripting or programmatic interface that other applications can invoke to create implicit permission profiles.

The profile update agent 140 is a software agent that executes periodically to update object permissions based on defined implicit permission profiles. In some embodiments, the authorization system 100 operates within an existing permissions system by adding and removing permissions implied by implicit permission profiles dynamically. In other words, at access time, the system may perform a typical access check to determine if a user has permission to act upon the object being accessed. The profile update agent 140 may be used to ensure that an object's permissions are up to date based on the defined set of implicit permission profiles and the current set of relationships among objects. This makes the access check efficient while still relieving the administrator of the burden of manually defining permissions for each user or other object.

The access check component 150 responds to authorization requests when an object is accessed. For example, an application may call an API to modify an object. The access check component 150 receives the call, and then the component 150 determines whether the calling user has access to the object. Each user may have an associated token that defines authorization information for that user, including group memberships, access control lists (ACLs), a user security identifier (SID), and so forth. In cases where a profile update agent 140 is not used, the access check may simply involve looking up the user identifier, verifying that the user has direct access to the object or indirect access through containment relationships in the accessor object hierarchy and/or accessed object hierarchy via an explicit permission profile. In other embodiments where a profile update agent is used, the access check component 150 may dynamically traverse defined implicit permission profiles to determine whether, even though the user does not have explicit permission to access the object, the user nevertheless can access the object based on a relationship defined in an implicit permission profile. Based on the defined implicit permission profiles and the user's relationship to the object, the system may grant access.

The container traversal component 160 traverses hierarchical relationships associated with an accessor or accessed object. For example, if a user attempts to access an object and there is no relationship between the user and object, there may still be a relationship between objects that contain the user or objects that contain the accessed object that permits the access. For example, an administrator may grant teams of users access to groups of accessed objects (e.g., computers in a particular datacenter). The container traversal component 160 ensures that such permission relationships are properly enforced.

The computing device on which the system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
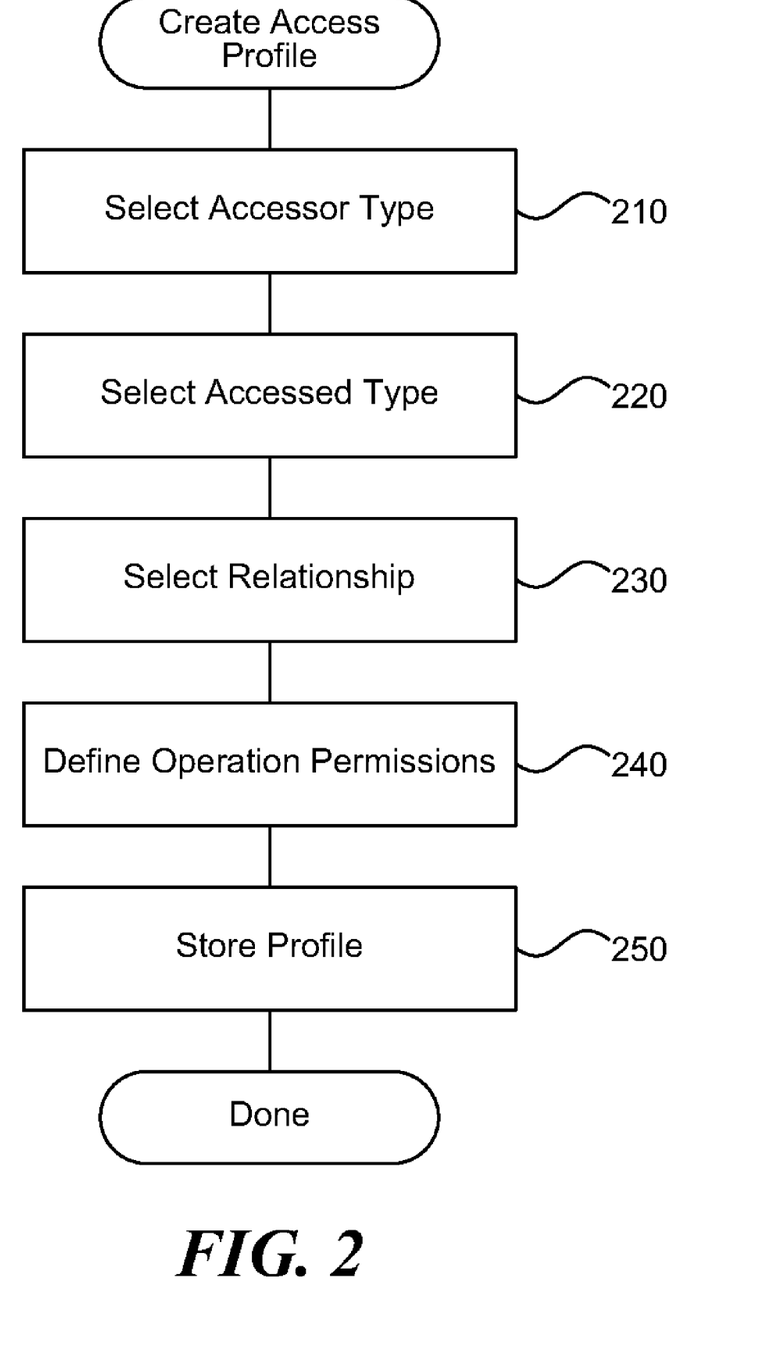
FIG. 2 is a flow diagram that illustrates the processing of the profile creation component when defining a new profile, in one embodiment.

FIG. 2 is a flow diagram that illustrates the processing of the profile creation component when defining a new profile, in one embodiment. Beginning in block 210, the component receives a selection of an accessor object type that identifies an object that will attempt to access another object based on a relationship. The accessor object may represent a user or any other type of object in a model-based, data-driven application. For example, the accessor object may represent a user or group in an organization. Continuing in block 220, the component receives a selection of an accessed object type that identifies an object that will be accessed by the accessor object. The accessed object may also represent many types of objects in a model-based, data-driven application. For example, the accessed object may represent a work item, computer system, support incident, vote in a poll, and so forth.

Continuing in block 230, the component receives a selection of a relationship type between the accessor object type and accessed object type. For example, the model-based, data-driven application may include relationships that represent assignment, ownership, contacts for an object, members of a team, and so forth. The administrator may associate different permissions with each type of relationship. For example, a contact associated with a support incident may not have permission to modify the incident, but a user to which the incident is assigned may be able to modify the incident. Thus, the system may allow more fine-grained access control based on the type of relationship.

Continuing in block 240, the component receives a definition of the permissions to grant to accessor objects that have the selected relationship type to accessed objects. For example, the permissions may include read, create, update, delete, and other types of operations. The permissions may also include custom types of operations, such as the permission to install new applications on computer systems, the ability to monitor activities of a user, and so forth. By defining object permissions based on relationships, the administrator can provide those permissions to any object having the specified relationship, without having to explicitly grant such permissions to each such object.

Continuing in block 250, the component stores the profile in a model store. The access check component may access the profile in response to a request to access an object. For example, when a user attempts an operation, the access check component may determine whether any relationships of the user grant the requested permission based on the stored profiles. Alternatively or additionally, a profile update agent may access the stored profiles to automatically grant explicit permission between objects that have relationships that match those defined in the profile. For example, the agent may enumerate items in the model store, enumerate profiles in the model store, and assign permissions based on any objects that have relationships matching the profiles. After block 250, these steps conclude.

Figure 3:
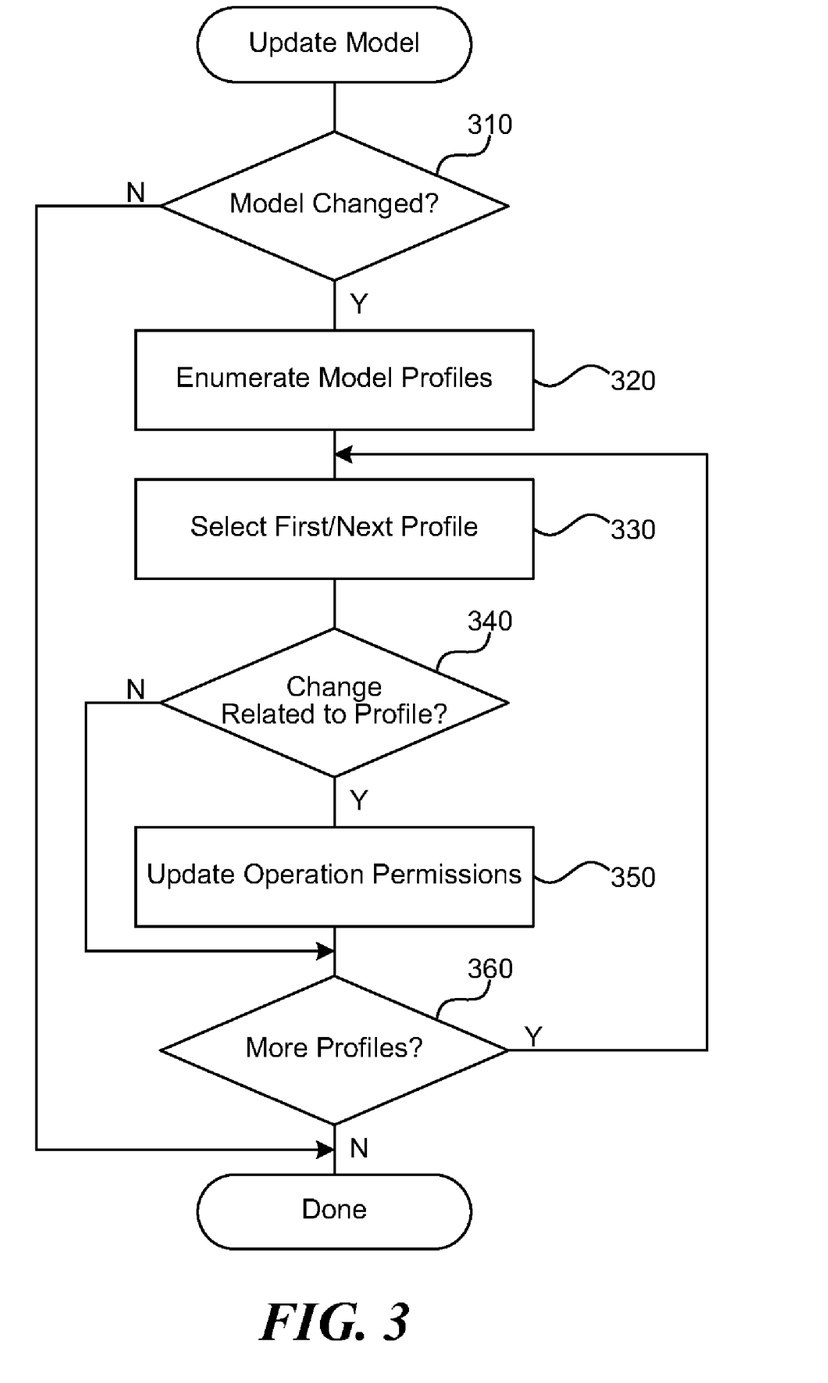
FIG. 3 is a flow diagram that illustrates the processing of the profile update agent, in one embodiment.

FIG. 3 is a flow diagram that illustrates the processing of the profile update agent, in one embodiment. The agent runs periodically to modify object permissions based on changes in the model and defined profiles. Beginning in decision block 310, if the model changed, then the component continues in block 320, else the component completes. For example, the model may have changed because a user created a new object, such as creating a new support incident, or modified an existing object, such as adding a user to a team or category of users. Continuing in block 320, the component enumerates model profiles to determine if the model changes imply any change in permissions based on defined profiles. Because profiles are relationship based, any time the model changes the permissions implied by profiles may also change.

Continuing in block 330, the component selects the first enumerated profile. Continuing in decision block 340, if the model change is related to the selected profile, then the component continues to block 350, else the component jumps to block 360. For example, if the model change includes a relationship that is specified in the profile, then the change is related to the profile. In addition, the model change may be related to the profile based on containment of the change by a defined profile relationship. Continuing in block 350, the component updates the operation permissions of objects associated with the profile and model change. For example, if a model change added a new work item, and a profile specifies various permissions for users related to work items, then the component assigns the permissions to the new work item for any related users. As another example, the component may remove permissions when relationships are updated. For example, if there can be at most one user assigned to a given work item, then when the related user for that work item changes from User A to User B the component revokes permissions previously granted to User A and grants the permissions to User B.

Continuing in decision block 360, if there are more defined profiles, then the component loops to block 330 to select the next profile, else the component completes and waits for the next model change or model inspection period. For example, the profile change agent may run periodically (e.g., every 30 minutes) to update permissions based on any model changes.

The profile change agent may determine whether the model change by inspecting a change journal, described further herein. After block 360, these steps conclude.

Figure 4:
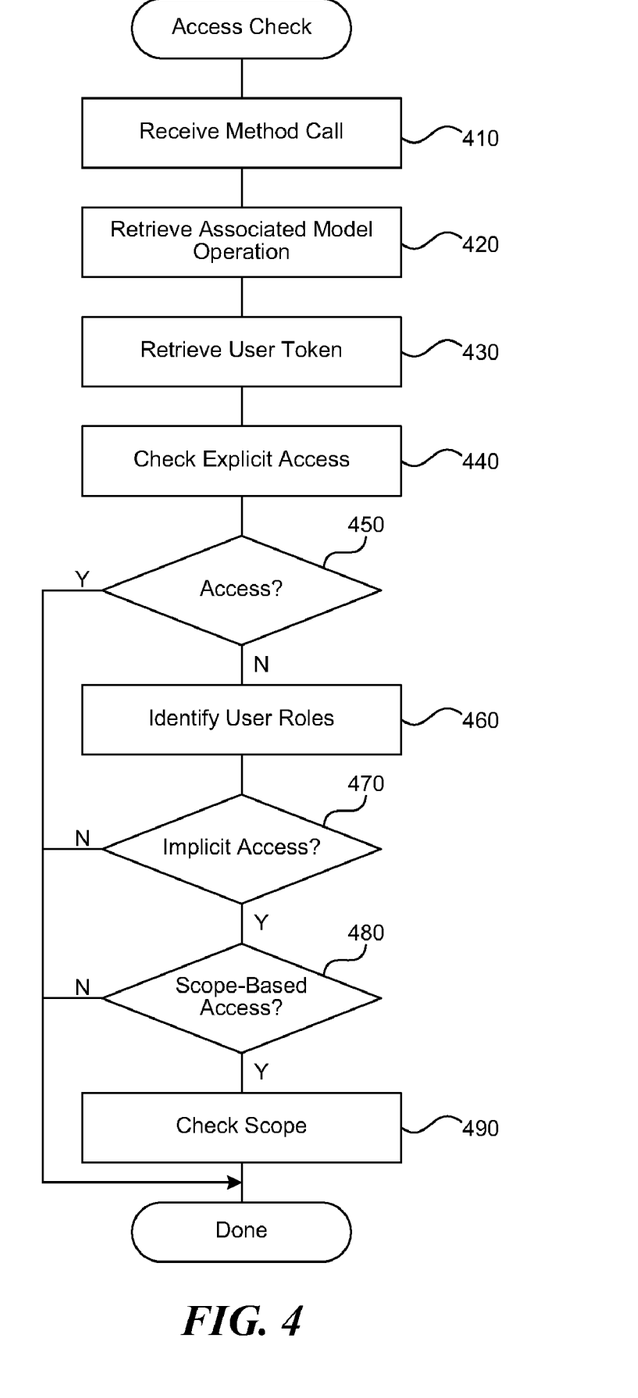
FIG. 4 is a flow diagram that illustrates the processing of the access check component when an operation occurs, in one embodiment.

FIG. 4 is a flow diagram that illustrates the processing of the access check component when an operation occurs, in one embodiment. An access check may occur because of a user action or programmatic API call, such as to a server-side component. Beginning in block 410, the access check component receives a method call that involves an access of one object in a data-driven model by another object. For example, a user may attempt to resolve a work item as complete, which may modify a status field of the item to indicate completion. Continuing in block 420, the component retrieves the model operation associated with the received method call. For example, the model may recognize actions such as "property set" or "object delete."

Continuing in block 430, the component retrieves the user token of the user or user on whose behalf a program called the API. For example, the user may provide a security identifier that the component can use to access the user's token. The token may include information such as groups to which the user belongs and other access information about the user. Continuing in block 440, the component determines whether the user has explicit access to perform the requested operation. For example, based on the user's identity or group memberships, the user may have explicit permission to perform the requested action. Continuing in decision block 450, if the component determines that the user has explicit access, then the component completes and carries out the operation, else the component continues at block 460.

Continuing in block 460, the component identifies the implied permission profiles of the user. For example, the user may be associated with an implied permission profile for work items assigned to engineers. Continuing in decision block 470, if the component identifies a relevant implied permission profile that grants the user permission to perform the operation on the related object, then the component continues at block 480 and implicitly grants the user the requested access to perform the operation, else the component completes and denies the user access.

Continuing in decision block 480, if the operation requests scope-based access, then the component continues in block 490, else the component completes. In some cases, an operation may request access based on scope rather than based on object type. In such cases, the component performs and additional check of the appropriate scope after verifying that the user or object type is permitted to perform the requested operation. Continuing in block 490, the component checks the scope and returns the result to the caller. After block 490, these steps conclude.

System Example

As an example, assume a number of records about work items exist in a database. These work item records represent things that people in an organization typically do, such as install a computer in a rack, move a database from one server to another, or order new memory for a computer. These work items have properties such as an identifier, description, scheduled start/end dates, actual start/end dates, category, and title. The work items also have relationships to other records in the database such as the user record that represents the person to which the work item is assigned. Work items are often logically grouped by team, organization, region, priority, and so forth for at least two reasons: 1) security boundaries—some work items should only be accessible by certain users and not others, and 2) user experience optimization—constraining the total number of work items visible to a given user to only show those work items that are relevant to that user so as not to clutter the user experience with irrelevant data.

Prior systems typically solve this problem by creating groups of users and groups of work items and then assigning a given group of users certain permissions to a given group of work items. For example, you could create a group of users ("Procurement People") and create a group of work items ("Purchase Work Items") where the category='Make Purchases'. You could then grant the 'procurement people' group of users certain permissions ("View" and "Edit") over the work items in the "Purchase Work Items" group. You could create another group of users ("Auditors") different permissions ("View" only) on the same "Purchase Work Items" group. This approach works well in many cases, but falls short in some cases. For example, if a work item is assigned to a particular user regardless of which groups the work item is a member of and regardless of which user groups the user is a member of, you could infer that the user should have permission to view and edit the work item or at least view it, but in prior models that is not the case unless explicitly granted by an administrator.

Using the authorization system, implied permissions uses these types of relationships to infer additional permissions for a user. If a given user (accessor) is related to an object via a certain relationship, he should get certain permissions on that (accessed) object. In some embodiments, the authorization system applies the concept of implied permissions additively to earlier systems like group assignment. Thus, a user may have all of the permissions of a prior system, and additional permissions based on the users relationships to objects.

The authorization system leverages an existing model of objects and relationships. Modeling involves defining classes of objects, the common properties of those objects, and the relationship types between those objects. Modeling concepts are used in directory systems such as Microsoft Active Directory and computer management systems such as Microsoft System Center Operations Manager or Microsoft System Center Service Manager. For example, a user can define a class called User and a class called Work Item and properties on those classes:

```
<ClassType ID="System.WorkItem">
    <Property ID="Id" Type="string"/>
    <Property ID="Title" Type="string" />
    <Property ID="Description" Type="string" />
    <Property ID="ContactMethod" Type="string" />
    <Property ID="ScheduledStartDate" Type="datetime" />
    <Property ID="ScheduledEndDate" Type="datetime" />
    <Property ID="ActualStartDate" Type="datetime" />
    <Property ID="ActualEndDate" Type="datetime" />
    <Property ID="Category" Type="enum" />
</ClassType>
<ClassType ID="System.User">
    <Property ID="Domain" Type="string" Key="true" />
    <Property ID="UserName" Type="string" Key="true" />
    <Property ID="FirstName" Type="string" />
    <Property ID="LastName" Type="string" />
    <Property ID="Company" Type="string" />
</ClassType>
```

Further, the user can define a relationship between those classes:

```
<RelationshipType ID="System.WorkItemAssignedToUser">
    <Source ID="IsAssignedToUser" Type="System.WorkItem" />
    <Target ID="AssignedWorkItem" MaxCardinality="1"
    Type="System.User"/>
</RelationshipType>
```

When these class, property, and relationship definitions are imported into a model-based system, such as Microsoft System Center Service Manager or Operations Manager, the authorization system extends the database schema to add new tables and other database elements such as views are added to accommodate storing and retrieving the new classes of objects. Next, the authorization system defines a profile that captures which relationship type is used to grant the implied permissions and which permissions are granted. In the example above, the permission is granted over the System.WorkItemAssignedToUser relationship type and the permissions granted are Object_Get (i.e., the permission to read or view an object) and Object_Set (i.e., the permission to edit an object).

```
<Profile>
    <ID>E95894A8-2E40-4bdc-A5DA-33B0700E92B3</ID>
    <Name>ImpliedWorkItemAssignedTo</Name>
    <DisplayName>Implied Work Item Assigned To</DisplayName>
    <Description>The Implied Work Item Assigned To grants users who are
        assigned work items permission to view and edit those work items.
    </Description>
    <IsImplicitProfile>true</IsImplicitProfile>
    <RelationshipTypeId>WorkItemAssignedToUser</RelationshipTypeId>
    <IsImplicitEndPointSource>true</IsImplicitEndPointSource>
    <OperationReferences>
    <OperationReference>
        <OperationName>Object_Get</OperationName>
    </OperationReference>
    <OperationReference>
        <OperationName>Object_Set</OperationName>
    </OperationReference>
    </OperationReferences>
</Profile>
```

Once a user has declared a profile, the authorization system evaluates requests based on the profiles, objects, and relationships defined in the model. For example, if a user who has a user name of DOMAIN\BOBG tries to view a work item that he is related to over the System.WorkItemAssignedToUser relationship, the permission to view would be granted because the Object_Get operation is allowed per the ImpliedWorkItemAssignedTo profile. If DOMAIN\BOBG tries to delete the work item that he is related to via the System.WorkItemAssignedToUser relationship, he would be denied because the Object_Delete operation is not allowed per the ImpliedWorkItemAssignedTo profile. In some embodiments, a user or administrator can extend the operations to handle generic operations such as 'Get', 'Set' (or 'Update'), 'Delete', 'Rename', 'Create', or can include operations which are specific to a certain class of objects.

While this example has discussed 'work items' and 'users' the authorization system is not limited to that extent. The model-based system allows for defining classes of virtually any objects and relationships between those objects. Security principals other than users such as systems/computers, groups of systems or users, or even one of the objects themselves can be accessors.

The authorization system can be a custom authorization system or based on existing authorization system, such as the Microsoft Authorization Manager (azman). The system may also leverage existing authentication systems, such as Microsoft Active Directory, to authenticate objects (e.g., users) that attempt to access other objects.

Permissions traverse over any relationship type defined as a "containment" relationship. For example, assume that a work item object could have child work items related by a "containment" relationship type. If a user is granted permission to the parent work item via an implied relationship profile as above, he will also be granted permission on the child work items contained by the parent work item. Similarly, if a user is a member of a user group which is has permission to a work item via an implied permissions then the user is granted the same permissions because of he is a member of the user group.

In some embodiments, the authorization system receives requests for access through an application programming interface (API) exposed by the system. For example, when a user attempts to open an object stored in the model, a user interface application may call the system through the API, requesting access to the object the user wants to open. The system determines whether the user has access to the object, based on any explicit permissions and the user's relationship to the object, and then grants or denies the request.

In some embodiments, the authorization system provides one or more predefined templates for user permissions based on a particular model. For example, the manufacturer of an application based on the system may ship templates defined in extensible markup language (XML) that define one or more relationships to a particular model and permissions for accessing objects granted to users having those relationships.

In some embodiments, the authorization system receives a journal of operations that modify user relationships to objects that the agent can use to update user profiles. Each operation that changes a user relationship to an object may imply a new grant or denial of access for the user based on the techniques described herein. The system may keep a journal of each such operation that the agent described herein checks periodically to determine whether additional access is appropriate for a user or whether particular access for that user is no longer appropriate. For example, a user may be assigned a new work item and the system may grant the user access to modify that work item. On the other hand, if a user resolves a work item so that it is no longer assigned to the user, then the system may remove permission for the user to modify the work item.

In some embodiments, the authorization system is extensible, allowing an administrator to create new classes of objects, new relationships, and new profiles that grant permissions based on relationships. An administrator may define new profiles based on changed needs or purposes of an organization to effectively manage object permissions for the organization. By allowing the administrator to define permissions in terms of relationships that are well understood in the organization, the system avoids the administrator explicitly defining permissions for each object and operation. This leads to fewer errors and more appropriate access for each user or object.

From the foregoing, it will be appreciated that specific embodiments of the authorization system have been described herein for purposes of illustration, but that various modifications may be made without deviating from the spirit and scope of the invention. For example, although particular examples of objects have been used herein, the system supports a flexible model-based definition of objects that can be extended to represent virtually any data-based system. Accordingly, the invention is not limited except as by the appended claims.

We claim:

1. A computer-implemented method for checking access of a user to perform an operation on an object, the method comprising:

receiving a method call that involves an access of the object by the user, wherein the object and user are part of a data-driven model that allow marking a relationship type in the model between an accessor object class and an accessed object class as an authorization relationship type and wherein the authorization relationship type defines one or more permissions granted to the accessor object on the accessed object without specifying a particular user or group of users;

retrieving the model operation associated with the received method call;

retrieving a user token of the user that called an application programming interface (API);

determining whether the user has explicit access to perform the requested operation; and in response to determining that the user does not have explicit access to perform the requested operation, identifying one or more roles associated with the user and one or more profiles associated with the roles; and upon identifying a role through which the user has permission to perform the operation, implicitly granting the user the requested access to perform the operation such that the user receives access permission dynamically based on the data-driven model without explicit authorization of the user or group membership management, wherein determining whether the user has explicit access to perform the requested operation comprises determining the user's access based on the user's identity or group memberships defined by the user's token;

wherein the preceding steps are performed by at least one processor.

2. The method of claim 1 wherein the received method call requests to modify a property of the object.

3. The method of claim 1 wherein retrieving the user token comprises accessing a security identifier provided in the received method call.

4. The method of claim 1 wherein the user token includes information about groups to which the user belongs and other access information about the user.

5. The method of claim 1 wherein the associated profiles specify one or more relationships between objects and one or more permissions granted to objects having the specified relationships.

6. The method of claim 1 further comprising storing the role that granted the user access to return to the user in the operation response.

7. The method of claim 1 further comprising, if the operation is a request for scope-based access, checking the scope and returning the result to the caller.

8. A computer system for implicitly granting permission to access objects in a data-driven model, the system comprising:

a processor and memory configured to execute software instructions;

a model manager configured to manage an in-memory representation of a data-driven model that operations can query to determine relationships and properties of the model, wherein the data-driven model allow marking a relationship type in the model between an accessor object class and an accessed object class as an authorization relationship type and wherein the authorization relationship type defines one or more permissions granted to the accessor object on the accessed object without specifying a particular user or group of users;

a model store configured to provide persistent storage for the data-driven model;

a profile creation component configured to provide an interface through which an authorized user can create profiles that define permissions to access objects in the data-driven model based on relationships among objects; and an access check component configured to respond to authorization requests when an object is accessed such that the user receives access permission dynamically based on the data-driven model without explicit authorization of the user or group membership management, wherein determining whether the user has explicit access to perform the requested operation comprises determining the user's access based on the user's identity or group memberships defined by the user's token.

9. The system of claim 8 wherein the model manager is further configured to provide an application programming interface (API) through which other applications or components make requests to view and manipulate the model.

10. The system of claim 8 wherein the model manager is further configured to invoke the model store to bring persistently stored objects into memory as they are needed and to persistently store changes made to objects through the model manager.

11. The system of claim 8 wherein the model store includes a transportable format for deploying the model to various organizations and to update the model with new features or objects.

12. The system of claim 8 wherein the profile creation component includes a user interface displayed on-screen to the user.

13. The system of claim 8 wherein the profile creation component includes a scripting or programmatic interface that applications can invoke to create profiles.

14. The system of claim 8 further comprising a profile update agent configured to execute periodically to update object permissions based on defined profiles so that an administrator can define access permissions implicitly based on relationships rather than manually defining permissions for each user or other object in the model.

15. The system of claim 8 wherein the access check component is further configured to dynamically traverse defined profiles to determine whether a user that does not have explicit membership-based permission to access an object can nevertheless access the object based on implicit relationship-based permission.

16. The system of claim 8 further comprising a container traversal component configured to traverse hierarchical relationships associated with an accessor object or an accessed object to determine whether a relationship exists between the accessor's ancestor objects or the accessed's ancestor objects that permits the access.

17. A storage device comprising instructions for controlling a computer system to define a new profile for relationship-based, implicit access to one or more objects, wherein the instructions, when executed, cause a processor to perform actions comprising:

receiving a selection of an accessor object type that identifies an object that will attempt to access another object based on a relationship, wherein the accessor object type is part of a data-driven model that allow marking a relationship type in the model between an accessor object class and an accessed object class as an authorization relationship type and wherein the authorization relationship type defines one or more permissions granted to the accessor object on the accessed object without specifying a particular user or group of users;

receiving a selection of an accessed object type that identifies an object that will be accessed by the accessor object;

receiving a selection of a relationship type between the accessor object type and accessed object type;

receiving a definition of the permissions to grant to accessor objects that have the selected relationship type to accessed objects; and storing the profile in a model store where an access check component can access the profile in response to a request to access an object such that the user receives access permission dynamically based on the data-driven model without explicit authorization of the user or group membership management, wherein determining whether the user has explicit access to perform the requested operation comprises determining the user's access based on the user's identity or group memberships defined by the user's token.

18. The storage device of claim 17 wherein defining object permissions based on relationships allows an administrator to apply those permissions to any object having the specified relationship, without having to explicitly grant such permissions to each such object.

19. The storage device of claim 17 further comprising receiving a request for a profile update agent to access the stored profile to automatically grant explicit permission between objects that have relationships that match those defined in the profile.

* * * * *